United States Patent [19]
Lieberman

[11] 3,745,516
[45] July 10, 1973

[54] AUXILIARY CLAMP FOR SIDE TERMINAL BATTERIES

[75] Inventor: Walter G. Lieberman, Minneapolis, Minn.

[73] Assignee: Goodall Manufacturing Corporation, Minneapolis, Minn.

[22] Filed: Dec. 9, 1971

[21] Appl. No.: 206,316

[52] U.S. Cl............... 339/228, 136/181, 339/258 R
[51] Int. Cl. ....................... H01r 11/22, H01m 5/00
[58] Field of Search.................... 339/228, 114, 224, 339/257, 258 R, 225; 136/181, 134, 135

[56] References Cited
UNITED STATES PATENTS

| | | | |
|---|---|---|---|
| 3,287,686 | 11/1966 | Ruehlemann | 339/258 R |
| 3,129,047 | 4/1964 | Bennett | 339/257 |
| 2,160,422 | 5/1939 | Shipman | 136/135 S |
| 3,605,065 | 9/1971 | Shannon | 339/28 R |

*Primary Examiner*—Marvin A. Champion
*Assistant Examiner*—William F. Pate, III
*Attorney*—Frederick E. Lange et al.

[57] ABSTRACT

An auxiliary clamp is disclosed for selective manual attachment to a battery cable terminal bolt used with a side terminal battery. The clamp includes a body portion with electrically conducting clamping means for selective engagement with cable terminal bolts of different size. The body portion of the clamp projects from the terminal bolt to a location where an electrically conducting terminal means on the body portion is conveniently accessible for the attachment of the resilient connecting jaws of an auxiliary battery charging or booster cable. The auxiliary clamp is preferably made from flat metal stock, and its body is bent in appropriate fashion to provide a stiff or reinforced area for the booster or charging cable clamps or other attachment and to serve as a handle for selective attachment and removal. In the preferred form, the clamping means is at one end of the body portion and includes resiliently separable clamping arms, the other end of the body is bent at an angle to the main body portion to provide a terminal portion which can extend above the top of the battery, and a slot between the resilient clamping arms extends all the way to the bent end portion which then provides a resilient hinge on an axis generally parallel to the axis of the battery terminal bolt.

6 Claims, 5 Drawing Figures

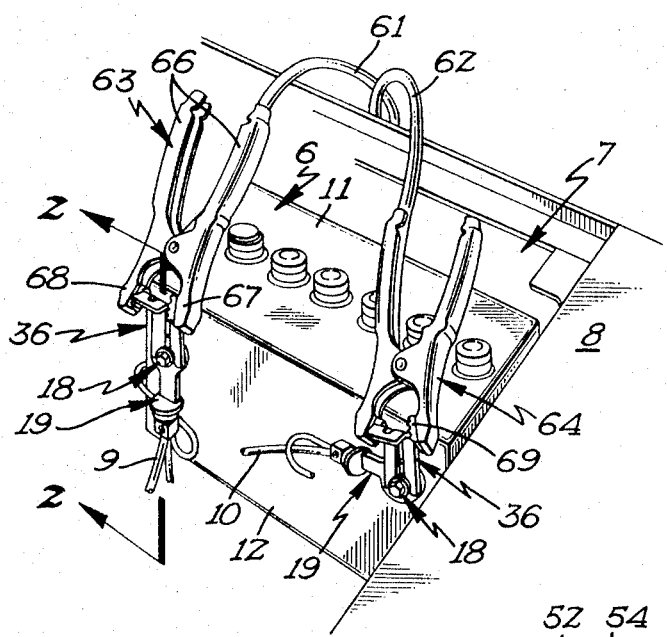
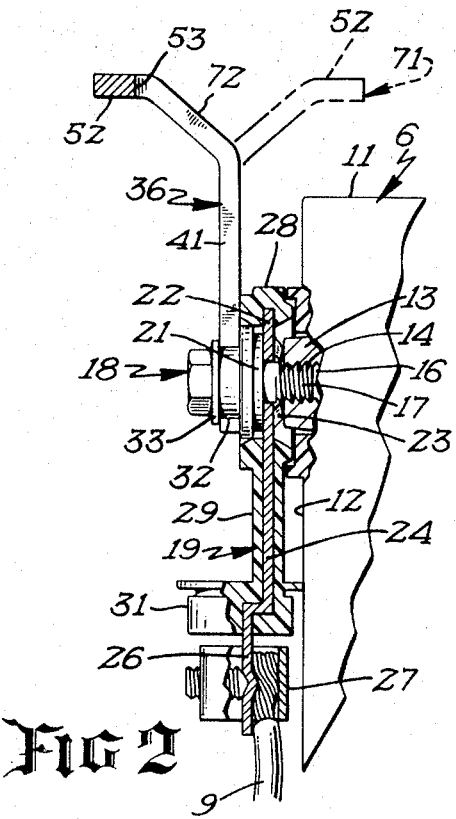
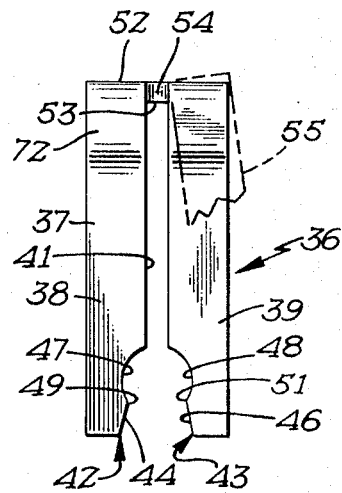
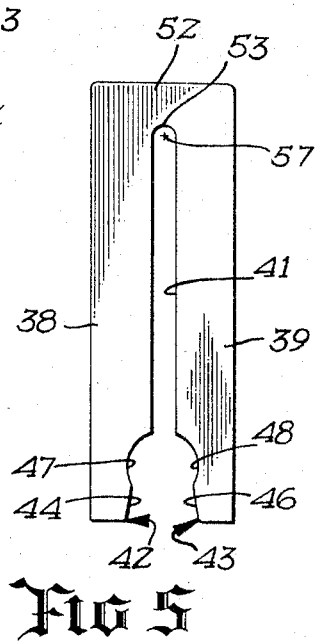

AUXILIARY CLAMP FOR SIDE TERMINAL BATTERIES

BACKGROUND OF THE INVENTION

Traditional batteries for motor vehicles of various types have included terminal posts which project upwardly from the top of the battery for connection to the usual battery cables. In such cases, both the terminal posts and the ends of the attaching cables are generally accessible from the top, when it becomes necessary or desirable to connect a booster or charging cable to the battery. Such booster or charging cables generally include resiliently movable gripping members which can be manually separated and resiliently engaged with the battery terminal post or the battery cable connection at the terminal post.

In recent years, however, there is a growing use of so-called side terminal batteries, in which battery cable terminal bolts are screwed into threaded positive and negative terminal receptacles in the side wall of the battery. Such terminal receptacles are normally either flush with the side wall or project only slightly, and include a threaded recess into which the terminal bolt of a battery cable connection is to be threaded. The sidewall location of these terminal receptacles and connecting bolts, and the surrounding portions of the vehicle in which such batteries are mounted make it difficult to readily engage the gripping members of a booster or charging cable with the battery terminal connecting bolts.

SUMMARY OF THE INVENTION

According to the present invention, an auxiliary clamp is provided for selective manual attachment to a laterally projecting cable terminal bolt or similar connection of a side terminal battery. Such a clamp includes a body portion having electrically conducting clamping means for the selective manually engageable attachment to such a bolt. The body portion also has electrically conducting terminal means spaced from the clamping means and electrically connected thereto. The terminal means and its relative location with respect to the clamping means provides for temporary manual connection of an auxiliary battery charging cable at a convenient location spaced from the cable terminal bolt.

The clamping means preferably includes at least one resiliently movable clamping member for resilient "snap-on" engagement with such a side terminal cable bolt. Specifically, the clamping means comprises resiliently separable clamping arms at one end of the body portion, and these clamping arms have camming portions at their outer ends and bolt engaging inner edge portions inwardly of the camming portions. The relative resilience and shape of the clamping members provide for selective engagement with cable terminal bolts of different size and may also provide for selective engagement of the clamp in at least two different relative positions or orientations on the cable terminal bolt.

The body portion of the clamp is preferably made of flat metal stock with the clamping arms at one end. The other end is bent or formed in such a manner that part of the metal stock is in a different plane from the main body portion which provides the clamping arms, and thus provides a reinforcing outer end which may serve as a convenient handle portion or as a relatively stiff and conveniently accessible auxiliary terminal portion to which the gripping members of an auxiliary battery charging cable can be temporarily manually connected. The length of the body portion is such that the terminal means can project inwardly above the top of the battery, where it will be at least as readily accessible as the upwardly projecting terminal posts on the top wall of the more customary earlier battery constructions. The projection of the terminal portion over the top of the battery also provides a safety factor which helps prevent accidental swinging of the clamp into short-circuiting engagement with nearby frame parts. The clamping member may, however, project in other directions from the side terminal battery connecting bolt in cases where the particular mounting arrangement or installation for the battery makes it easier to connect a booster or charging cable gripping member at the ends or side of the battery, rather than above the top.

Preferably, the auxiliary clamp is formed from flat metal stock which has its outer end bent substantially at right angles to the rest of the body portion and in which the resilient clamping arms at the battery cable terminal bolt engaging end are defined by a slot which extends all the way from the clamping end of the device to the right angled portion at the opposite end. Thus the remaining flat portion of that end can provide a resilient hinging action for said clamping arms by resilient flexing of the flat portion along a line which is essentially an extension of the slot and which is generally perpendicular to the plane of the main body portion of the clamp, and thus generally parallel to the axis of whatever battery terminal connecting bolt is to be engaged between the clamping arms. The use of such a bent end portion to permit resilient flexing of the clamping arms by bending of the end portion around a hinge axis lying in the plane of the bent end helps make it possible to construct such an auxiliary clamp from a low carbon steel which is relatively more economical than the better grades of spring steel, and with a shorter clamping arm length for the same degree of resilience, as compared to a completely flat or planar clamp.

BRIEF DESCRIPTION OF THE DRAWINGS

In the drawings which form a part of this application, and in which like characters indicate like parts, FIG. 1 is a partial perspective view showing a side terminal battery installation in which auxiliary clamps of the present invention are used for the connection of a battery charging cable;

FIG. 2 is a partial sectional view on the line 2—2 of FIG. 1 showing further details of the normal side terminal battery cable connection and the manner in which the auxiliary clamp of the present invention can be selectively engaged with a cable terminal bolt in two different relative orientations;

FIG. 3 is a side view of the auxiliary clamp of FIG. 2;

FIG. 4 is a front view of the device of FIG. 3; and

FIG. 5 is a front view of a flat blank from which the preferred auxiliary clamp of FIGS. 3 and 4 can be formed by appropriate bending of the strip.

DESCRIPTION OF THE PREFERRED EMBODIMENT

As shown in FIG. 1 a storage battery 6, which has the relatively new side terminal construction, is mounted in a recess 7 within the engine compartment of a suitable vehicle. The recess may be surrounded by partitions or fender parts 8.

The battery is connected to the normal battery cables 9 and 10 in any standard fashion, and the details of one such connection are further illustrated in FIG. 2. Unlike the more usual earlier battery arrangement, the battery 6 does not have terminal posts which project upwardly from the top wall 11. Instead, battery 6 has terminal receptacles which are positioned on one of the side walls 12 of the battery. Each terminal receptacle includes a metal terminal portion 13 which is either substantially flush with the side wall 12 or projects only slightly outwardly therefrom. As shown, portion 13 may be surrounded by a plastic insulating ring, with a slightly projecting annular rib. A threaded recess 14 is located in the metallic terminal portion and extends inwardly at 16 far enough to receive the threaded end 17 of the terminal bolt 18 of a suitable battery cable assembly 19. Terminal bolt 18 includes a flange 21 which engages the head 22 of connector assembly 19 and forces it firmly against the side terminal 13. In the form shown in FIG. 2, the cable connector assembly includes a metallic conducting portion 23 attached for direct engagement with the metallic terminal portion 13. A metallic connecting strip 24 extends downwardly at 26 to a point where a clamp 27 serves to make a physical and electrical conneciton of the battery cable 9. The portions 23 and 24 may be encapsulated in a plastic insulating body portion including enlarged head 28, a longitudinal connection 29 and end cap 31. (In original equipment forms of cable connectors the plastic encapsulating body may also enclose the cable and connections at 26 and 27. Separate clamp 27 of FIG. 2 is typical of a replacement cable connection assembly.)

The terminal bolt 18 includes a cylindrical head portion 32 extending outwardly from flange 21 to the hexagonal head of the terminal bolt 18. In many such posts a further retaining flange 33 projects between the cylindrical portion 32 and the head of the bolt.

According to the present invention, an auxiliary clamp 36 is provided to facilitate the selective connection and removal of the gripping members 63 and 64 of the auxiliary charging cables 61 and 62 as shown in FIG. 1. Such gripping members customarily include manual hand grips 66 and resiliently closed gripping jaws 67 and 68 which may include conductive gripping teeth 69 protected within insulating outer portions of jaws 67 and 68.

The auxiliary clamp is provided at one end with electrically conductive clamping means for selective manual engagement with the battery terminal bolt 18, and at the other end with electrically conductive terminal means projecting far enough from the battery terminal bolt to facilitate the engagement of the charging cable members. Thus, as shown in FIGS. 1 and 2, auxiliary clamps 36, can extend upwardly from the side terminals to a level above the top wall 11 of the battery, where the gripping members of the charging cables can be attached more conveniently. The term "charging cable," as used herein, will be understood to include either a battery charger cable, or a booster cable as used for difficult starts.

The details of the preferred auxiliary clamp of the present invention are further shown in FIGS. 3, 4 and 5. Thus the auxiliary clamp has an elongated body portion 37, with a pair of clamping arms 38 and 39 at one end, separated by a longitudinally extending slot 41. These clamping arms 38 and 39 have opposite inner edges which define and are separated by slot 41. These opposite inner edges, at their outer ends 42 and 43, are spaced apart a distance slightly greater than the largest diameter of any terminal bolt portion 32 with which the auxiliary clamp is designed to be used. The portions of these inner edges of the clamping arms just above the end of the clamp are inclined inwardly toward each other as shown at 44 and 46, at a gentle angle which can provide an effective camming surface to force the clamping arms apart, when the auxiliary clamp is pushed onto a terminal bolt 18 in the manner shown in FIG. 2. The camming portions 44 and 46 diverge from each other toward their outer ends at an angle less than 25°, and in this specific example the angle is substantially 20°.

To provide the desired selective clamping engagement, the opposed inner edges of the clamping arms are further provided with terminal bolt engaging surfaces 47 and 48 which are separated, when the clamp is not engaged with a terminal bolt, by a distance slightly less than the diameter of the terminal bolt with which these portions are adapted to engage. Between these bolt engaging portions 47 and 48 and the camming portions 44 and 46 of the clamping arms 38 and 39, the inner edges may also be provided with retaining projections 49 and 51 which are adapted to snap below or behind the terminal bolt portion 32, once the auxiliary clamp has been pushed onto the terminal bolt. Thus shoulders 49 and 51 will also be spaced apart a distance less than the diameter of the terminal bolt.

Although the camming portions 44 and 46, the bolt engaging portions 47 and 48, and the shoulders 49 and 51 have been shown as symmetrically arranged with respect to the longitudinal axis of slot 41, it will be understood that absolute symmetry is not essential, and that the inner edge of one of the clamping arms 38 and 39 could be substantially straighter and extend generally longitudinally of the slot, while the opposite edge of the other clamping arm could be shaped to provide the necessary camming bolt engaging and/or retaining portions.

In the preferred form, the other or upper end of the auxiliary clamp 36 is bent in such a manner as to perform one or more of three different functions. One purpose of bending the end is to provide a more convenient shape for gripping the auxiliary clamp in the fingers or hand of an operator, or between the gripping member jaws of an auxiliary battery charging cable, to facilitate its attachment to or removal from the battery terminal post. A second function is to provide a more convenient shape for engagement by the gripping members of the battery charging cable, so that a firm electric connection can be obtained from any one of a number of different angles, depending on the particular mounting of the battery and the direction from which the battery charging cable can best be brought into the battery. A third function, as illustrated by the preferred form of the invention in these figures, is to provide a resilient hinge for the desired movement of the clamping arms 38 and 39 away from and toward each other.

For this purpose the upper end of the auxiliary clamp body extends as shown at 52 in a plane at substantially right angles to the plane of the main body portion 37 and arms 38 and 39. By bending the upper end 52 in this manner, and by extending slot 41 all the way up through the main body portion 37 to a point 53 in the bent end portion 52, it is possible to provide a resilient hinge action along a line 54 which lies in the plane of end 52 at right angles to the plane of the main body portion 37. Thus the hinge axis 54, in effect, is parallel to the axis of the terminal bolt 18 to which the auxiliary clamp is to be connected. Then, as shown in somewhat exaggerated fashion by the dotted line portion of FIG. 4 at 55, the clamping arm 39 separates from the clamping arm 38 by swinging to the dotted line position 55 around the axis 54. This involves a bending or flexing of the flat end portion 52, which is believed to make it possible to use a more economical material for the clamp than would be possible if the slot 41 merely terminated in a part of the main body portion which is in the same plane as arms 38 and 39. Thus a more economical carbon steel can be used for such an auxiliary clamp than the more expensive spring steel materials which might be necessary in the absence of this orientation of the hinge. For a given material, the provision of a resilient hinge action by resilient flexing of the flat right-angled portion 52 (or by an equivalent portion which is at least partially bent out of the plane of the clamping arms at a location adjacent the end of slot 41) is also believed to achieve a given degree of resilience for arms 38 and 39 with a relatively shorter clamp length than would be the case if the clamp portion beyond slot 41 was completely in the same plane as arms 38 and 39.

An understanding of this hinge action may be facilitated by examination of FIG. 5, which shows a completely flat blank, identical to the auxiliary clamp member 36, except that it has not yet been bent to the form shown in FIG. 3. If the clamp were used in the form shown in FIG. 5, the relative separation of clamping arms 38 and 39 would, in effect, be along a hinge line perpendicular to the plane of the end portion 52 of the clamp, i.e., a line which, as viewed in FIG. 5, runs perpendicular to the plane of the drawing at point 57. Because of the longitudinal dimension of the portion 52 between the end of slot 41 and 53 and the upper end of the device, there would be a relatively long mass of metal at this point which would not tend to flex to the extent required for separating movement of the ends of arms 38 and 39, unless the arms were made longer or narrower as viewed in FIG. 5. However, for some applications, the device shown in FIG. 5, without further bending of the upper portion 52, might be used as an auxiliary battery clamp, if a sufficiently resilient spring steel or similar material were used for the arms 38 and 39 or other portions of the clamp. It is my belief that the same degree of resilience for engagement of arm 38 and 39 with a battery terminal bolt 18 can be achieved with a shorter and safer clamp and with a less expensive form of material, by adopting the preferred construction shown in FIGS. 3 and 4. In any case, the resilient force of engagement of the clamping means must be great enough to maintain the clamp in its selectively engaged position during normal use, with tight electric contact at bolt 18 to avoid overheating.

This clamping force is determined by the factors discussed, i.e., the shape and arrangement of the parts and the particular metal stock used, and by the specific dimensions of the parts. The thickness of the clamping edges 47 and 48, i.e., the thickness of the strip as viewed in FIG. 3, should be sufficient to provide the desired area of gripping engagement and minimize rocking, twisting or slipping of the clamp on bolt 18.

The thickness is also important in order to provide a sufficient contact pressure between the clamping means and terminal bolt and sufficient total cross section of metal throughout the length of the strip to avoid excessive heating of the clamp in response to passage of the currents of substantial amperage which may be used in a battery charging or emergency starting operation. For example, currents of 75 amperes may be involved in a battery charging operation, while much higher current values are reached in emergency starting or booster applications, e.g., 200 to 300 amperes at 10 to 12 volts. The heat generated in watts may thus be as high as 3,000 watts (amperes × volts) and is proportional to the resistance of the strip (i.e., $I^2 \times R$, where I is the current and R the resistance). The thickness and width of the strip should provide sufficient conductivity to prevent the clamp from becoming too hot to touch (i.e. hotter than about 140° Fahrenheit), if a current of 200 to 300 amperes is maintained for 2 to 3 minutes.

A preferred embodiment, as shown in FIGS. 3 and 4 was made from type 1,018 cold drawn steel having a thickness of 0.125 inches. The total length of the flat blank, from top to bottom in FIG. 5, was 3 inches, and the total width 1 inch. Flat main body portion extended 1.75 inches from the ends of the clamping arms to the first bend of the intermediate terminal portion, which was bent at an angle of 50° from the plane of body portion 37. End 53 of slot 41 was formed on a 0.078 inch radius around an axis 57 (FIG. 5) 0.375 inches from the end of area 52, which was bent along a line across the strip substantially at point 57 (FIG. 5). Thus portion 52 is at an acute angle of 40° to the intermediate terminal portion and is in a plane perpendicular to the main body portion 37. Also, the slot width was substantially 0.156 inches from end 53 to the clamping edges 47 and 48. These clamping edges were formed on a radius of 0.25 inches around a center point 0.375 inches from the ends of clamping arms 38 and 39. The outer ends of camming portions 44 and 46 were spaced apart 0.530 inches and each camming portion converged toward the other at a 10° angle from the longitudinal axis of the clamp, for a total realtive angular convergence of 20°. The entire clamp may be finished with a 0.0005 to 0.001 inch thick copper plating.

Moreover, the provision of the perpendicular or bent auxiliary terminal portion 52 makes it possible to engage the clamp with the terminal bolt in at least two different selective positions or orientations. Thus in the heavy line position of FIGS. 1 and 2, terminal portion 52 extends above, i.e., higher than, the level of battery top 11, but projects outwardly away from the area above the battery top. In the dotted line position of FIG. 2, terminal portion 52 extends inwardly at 71 to a point above the battery top 11. In this position, terminal 52 is less likely to swing accidentally against an adjacent frame member and may actually swing down against the insulated battery top 11, in case clamp 36 is left in position on bolt 18 after a charging or starting operation.

Finally, the provision of an intermediate angular terminal portion 72 between body portion 38 and terminal portion 52, as shown in FIGS. 2 and 3, provides an additional terminal area inclined at an angle of 40° to 50° between the flat body portion 38 and end 52. Thus an operator or user has a choice of connecting the gripping jaws of an auxiliary battery charging cable to any of these three differently oriented portions and can select a point of attachment and a relative position or orientation of clamp 36 which provides the most convenient and safest access for the temporary charging cable connection.

According to the foregoing specification, the general principles which are believed to apply to the present invention have been described, together with some of the ways of practicing the invention, including the best mode presently contemplated for this purpose.

I claim:

1. An auxiliary battery clamp for selective manual attachment to and removal from a laterally projecting cable terminal bolt when such bolt is connected to a side terminal battery, said clamp comprising an elongated body portion having electrically conducting clamping means at one end for selective manually engageable attachment to such a cable terminal bolt, and said body portion also having electrically conducting terminal means at its other end spaced from said clamping means and electrically connected thereto, said terminal means and its relative location with respect to said clamping means providing for temporary manual connection of an auxiliary battery charging cable to the terminal means at a convenient location spaced from such cable terminal bolt, said clamping means comprising clamping arms at least one of which is resiliently separable from the other by relative movement in a plane defined by said arms, said clamping arms having opposed inner clamping edges defining and separated by a slot extending into the body portion from said one end, said clamping edges having bolt engaging portions for selective resilient engagement with opposite surfaces of such a cable terminal bolt, and said terminal means at the other end of the body portion including a portion which is at least partially bent out of the plane of the clamping arms at a location adjacent the end of said slot and which thereby provides a gripping and auxiliary terminal portion having a size and relative location for convenient selective manual engagement during attachment of the auxiliary clamp to such a battery cable terminal bolt and removal therefrom and for selective engagement by gripping members of such an auxiliary battery charging cable while the clamp is attached to such a terminal bolt, the length of the clamp from its clamping means to its terminal means being substantially 2 inches and being thereby greater than the expected normal distance from the top of a side terminal battery to its side terminal bolt location.

2. An auxiliary battery clamp according to claim 1 in which the body portion, clamping means and terminal means are made of conducting material having a thickness and resilience providing tight electric contact at said terminal bolt and sufficient to conduct currents of 200 to 300 amperes at up to 12 volts for 2 to 3 minutes without increasing the temperature of the clamp substantially above 140° F.

3. An auxiliary battery clamp for selective manual attachment to a laterally projecting cable terminal bolt used with a side terminal battery, said clamp comprising an elongated body portion having electrically conducting clamping means for selective manually engageable attachment to such a cable terminal bolt, and said body portion also having electrically conducting terminal means spaced from said clamping means and electrically connected thereto, said terminal means and its relative location with respect to said clamping means providing for temporary manual connection of an auxiliary battery charging cable to the terminal means at a convenient location spaced from such cable terminal bolt, said clamping means comprising resiliently separable clamping arms at one end of the body portion for selective engagement with opposite surfaces of a cable terminal bolt, said clamping arms having outer ends and having opposed inner clamping edges defining and separated by a slot extending into the body portion from said outer ends, said opposed inner clamping edges being spaced from each other at said outer ends by a distance greater than the thickness of the various cable terminal bolts with which the auxiliary clamp may be used, at least one of said clamping edges tapering gradually inwardly toward the other from said one end to provide opposed camming portions for resiliently separating the clamping arms in response to manual movement of said one end longitudinally of said arms onto a terminal bolt, and said clamping edges also having bolt engaging portions inwardly of said camming portions and spaced from each other by a distance less than the thickness of such a terminal bolt for firmly and resiliently engaging such terminal bolt after the clamping arm ends and camming portions have been forced past such terminal bolt with the bolt in said slot, said terminal means being located at the other end of the clamp and including a flat portion extending at substantially right angles to the body portion of the clamp in a direction generally parallel to a terminal bolt with which the clamping arms are to be engaged, said clamping arms extending longitudinally of the body portion and said slot extending throughout the length of the body portion from the terminal bolt engaging portions to the flat portion, thereby providing a resilient hinge action for said clamping arms by resilient flexing of the flat portion.

4. An auxiliary battery clamp according to claim 3 in which the clamp is made from metal stock, in which the clamping arms and body portion are in one plane, the other end of the clamp is in a plane at right angles to the plane of said clamping arms and body portion, and said other end is connected to the clamping arm portions by an intermediate terminal portion in a plane at an angle to each of said other planes, thereby providing plane areas for attachment of a gripping member at any one of three different angles at said other end of the auxiliary clamp.

5. An auxiliary battery clamp for selective manual attachment to and removal from a laterally projecting cable terminal bolt when such bolt is connected to a side terminal battery, said clamp comprising an elongated body portion having electrically conducting clamping means at one end for selective manually engageable attachment to such a cable terminal bolt, and said body portion also having electrically conducting terminal means at its other end spaced from said clamping means and electrically connected thereto, said terminal means and its relative location with respect to said clamping means providing for temporary manual connection of an auxiliary battery charging cable to the terminal means at a convenient location spaced from such cable terminal bolt, said clamping means comprising clamping arms at least one of which is resiliently separable from the other by relative movement in a plane defined by said arms, said clamping arms having opposed inner clamping edges defining and separated by a slot extending into the body portion from said one end, said clamping edges having bolt engaging portions for selective resilient engagement with opposite surfaces of such a cable terminal bolt, and said terminal means at the other end of the body portion including a portion bent substantially at right angles out of the plane of the clamping arms into a plane which is generally parallel to such a cable terminal bolt when the auxiliary clamp is selectively attached thereto and which thereby provides a gripping and auxiliary terminal portion having a size and relative location for convenient selective manual engagement during attachment of the auxiliary clamp to such a battery cable terminal bolt and removal therefrom and for selective engagement by gripping members of such an auxiliary battery charging cable while the clamp is attached to such a terminal bolt, and said slot extending throughout the length of the body portion from said one end into said terminal portion bent substantially at right angles.

6. An auxiliary battery clamp according to claim 5 in which the clamp is formed from a single piece of flat low carbon cold drawn steel, and said clamping means comprises at least one resiliently movable clamping arm having a resilience and shape providing resilient "snap-on" engagement of the clamping means with the cable terminal bolt.

* * * * *